United States Patent
Tian et al.

(10) Patent No.: US 9,787,355 B2
(45) Date of Patent: Oct. 10, 2017

(54) SYSTEM AND METHOD FOR COMMUNICATION USING HYBRID SIGNALS

(71) Applicant: QUALCOMM Incorporated, San Diego, CA (US)

(72) Inventors: Bin Tian, San Diego, CA (US); Gwendolyn Denise Barriac, Encinitas, CA (US); Sameer Vermani, San Diego, CA (US); Hemanth Sampath, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 3 days.

(21) Appl. No.: 14/042,475

(22) Filed: Sep. 30, 2013

(65) Prior Publication Data

US 2014/0119410 A1 May 1, 2014

Related U.S. Application Data

(60) Provisional application No. 61/719,217, filed on Oct. 26, 2012.

(51) Int. Cl.
*H04B 1/00* (2006.01)
*H04B 1/707* (2011.01)
(Continued)

(52) U.S. Cl.
CPC ............ *H04B 1/707* (2013.01); *H04L 25/493* (2013.01); *H04L 27/0008* (2013.01); *H04L 27/02* (2013.01); *H04L 27/2601* (2013.01)

(58) Field of Classification Search
CPC ....... H04J 14/0298; H04J 15/00; Y02B 60/50; H04B 1/707; H04B 10/11; H04B 10/516;
(Continued)

(56) References Cited

U.S. PATENT DOCUMENTS 6,366,600 B1 * 4/2002 Agrawal et al. .............. 375/130
6,996,154 B2 2/2006 Haas
(Continued)

OTHER PUBLICATIONS

Tsonev et al. ; Inst. for Digital Commun., Univ. of Edinburgh, Edinburgh, UK; GLOBECOM Workshops (GC Wkshps), 2011 IEEE; Dec. 5-9, 2011, pp. 728-732.*

*Primary Examiner* — Leila Malek
(74) *Attorney, Agent, or Firm* — Knobbe, Martens, Olson & Bear LLP

(57) ABSTRACT

Systems and methods for communication using hybrid signals are disclosed. In one aspect an apparatus for communication includes a processing system configured to encode a first set of information in a plurality of symbols and to encode a second set of information according to a spacing among the symbols. The apparatus may further comprise a transmitter configured to transmit to a device the symbols with the spacing among the symbols. In another aspect, an apparatus for communication includes a processing system configured to decode a first set of information from a plurality of symbols encoded with the first set of information or a second set of information from a spacing among the symbols by determining the spacing among the symbols. The apparatus may further comprise a receiver configured to receive the symbols via a wireless communication.

46 Claims, 7 Drawing Sheets

(51) Int. Cl.
　　*H04L 25/493*　　(2006.01)
　　*H04L 27/00*　　(2006.01)
　　*H04L 27/26*　　(2006.01)
　　*H04L 27/02*　　(2006.01)

(58) Field of Classification Search
　　CPC .............. H04L 27/2697; H04L 1/0003; H04L
　　　　27/0008; H04L 27/2601; H04L 1/0625;
　　　　H04L 1/1867; H04L 25/03343; H04L
　　　　27/02
　　USPC ......... 375/140, 146, 147, 295, 316; 370/252
　　See application file for complete search history.

(56) References Cited

U.S. PATENT DOCUMENTS

| | | | |
|---|---|---|---|
| 7,155,263 B1 | 12/2006 | Bergamo | |
| 8,185,210 B2 | 5/2012 | Haubrich et al. | |
| 8,509,326 B2 | 8/2013 | Mueck | |
| 2007/0087695 A1* | 4/2007 | Cohen et al. | 455/63.4 |
| 2009/0116572 A1* | 5/2009 | Fujita et al. | 375/267 |
| 2010/0150042 A1* | 6/2010 | Oh et al. | 370/311 |
| 2010/0303099 A1* | 12/2010 | Rieken | 370/479 |
| 2010/0310258 A1* | 12/2010 | Wang | H04Q 11/0062 398/115 |
| 2011/0026577 A1* | 2/2011 | Primo | H04L 25/0212 375/232 |
| 2011/0087879 A1* | 4/2011 | Chand | H04K 3/25 713/153 |
| 2011/0274429 A1* | 11/2011 | Caplan et al. | 398/65 |
| 2012/0014692 A1* | 1/2012 | Kim et al. | 398/34 |
| 2012/0120859 A1* | 5/2012 | Stephens et al. | 370/311 |
| 2012/0122495 A1* | 5/2012 | Weng | H04W 68/025 455/458 |
| 2012/0235882 A1* | 9/2012 | Iverson et al. | 343/905 |
| 2012/0320900 A1 | 12/2012 | Duman | |
| 2013/0266319 A1* | 10/2013 | Bodan et al. | 398/79 |
| 2014/0092945 A1* | 4/2014 | Shenoy | 375/224 |

\* cited by examiner

SYSTEM AND METHOD FOR COMMUNICATION USING HYBRID SIGNALS

CLAIM OF PRIORITY UNDER 35 U.S.C. §119

The present Application for Patent claims priority to Provisional Application No. 61/719,217 entitled "SYSTEM AND METHOD FOR COMMUNICATION USING HYBRID SIGNALS" filed Oct. 26, 2012, and assigned to the assignee hereof. Provisional Application No. 61/719,217 is hereby expressly incorporated by reference herein.

BACKGROUND

Field

The present application relates generally to communications, and more specifically to systems and methods for communication using hybrid signals. Certain aspects herein relate to hybrid low power wake up signals and operations for WLAN.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments allow communication using hybrid signals.

One aspect of the disclosure provides an apparatus for communications. The apparatus includes a processing system configured to encode a first set of information in a plurality of symbols and to encode a second set of information according to a spacing among the symbols.

Another aspect of the disclosure provides an implementation of a method of communication. The method includes encoding a first set of information in a plurality of symbols and encoding a second set of information according to a spacing among the symbols.

Another aspect of the disclosure provides an apparatus for communication. The apparatus comprises means for encoding a first set of information in a plurality of symbols. The apparatus further comprises means for encoding a second set of information according to a spacing among the symbols.

Another aspect of the disclosure provides a computer program product for communication comprising a computer readable medium encoded thereon with instructions. The instructions, when executed, cause an apparatus to encode a first set of information in a plurality of symbols and encode a second set of information according to a spacing among the symbols.

Another aspect of the disclosure provides a wireless node. The wireless node includes at least one antenna, a processing system configured to encode a first set of information in a plurality of symbols and to encode a second set of information according to a spacing among the symbols, and a transmitter configured to transmit, via the at least one antenna, to a device the symbols with the spacing among the symbols.

Another aspect of the disclosure provides an apparatus for communication. The apparatus includes a processing system configured to decode a first set of information from a plurality of symbols encoded with the first set of information or a second set of information from the spacing among the symbols by determining the spacing among the symbols.

Another aspect of the disclosure provides a method of communication. The method includes decoding a first set of information from a plurality of symbols encoded with the first set of information or a second set of information from a spacing among the symbols by determining the spacing among the symbols.

Another aspect of the disclosure provides an apparatus for communication. The apparatus includes means for decoding a first set of information from a plurality of symbols encoded with the first set of information. The apparatus further includes means for decoding a second set of information from a spacing among the symbolsby determining the spacing among the symbols.

Another aspect of the disclosure provides a computer program product for communication comprising a computer readable medium encoded thereon with instructions. The instructions, when executed, cause an apparatus to decode a first set of information from a plurality of symbols encoded with the first set of information or a second set of information from a spacing among the symbols by determining the spacing among the symbols.

Another aspect of the disclosure provides a wireless node. The wireless node includes at least one antenna. The wireless node further includes a receiver configured to receive, via the at least one antenna, a plurality of symbols encoded with a first set of information, wherein a second set of information is encoded according to a spacing among the symbols being encoded with a second set of information. The wireless node further includes a processing system configured to decode the first set of information from the symbols or the second set of information from the spacing among the symbols. Decoding the second set of information comprises determining the spacing among the symbols.

DETAILED DESCRIPTION

Figure 1:
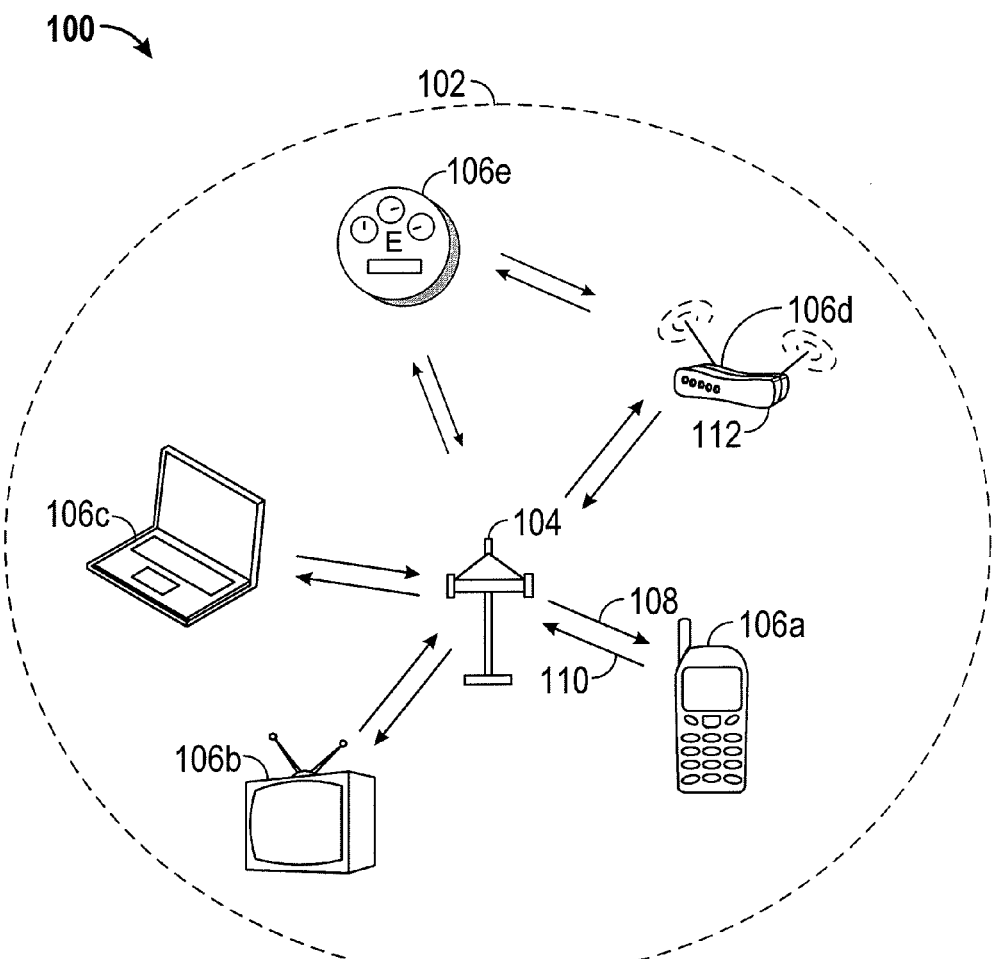
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Certain implementations as will be described below relate to a system and method for communication using a hybrid signal. In one implementation, a method of communication may include encoding a first set of information in a plurality of symbols, encoding a second set of information according to a spacing between the symbols, and transmitting to a communication device a hybrid signal including the symbols with the spacing between the symbols. As such, the hybrid signal carries both the first set of information and the second set of information at the same time.

In some illustrative implementations as will be described below, the system and method are used to send a hybrid ultralow power wakeup signal in wireless communications. In one implementation, both the first set of information and the second set of information include a wakeup signal. The second set of information is encoded according to on-off-keying modulation while the first set of information is encoded according to a different scheme. The second set of information consumes less power to decode than the first set of information, but is more sensitive to noise and interference. The implementation thus allows a receiver in receipt of the hybrid signal to extract the wakeup signal by decoding the first set of information or the second set of information, depending on the received signal strength at the receiver. As a result, the hybrid signal allows a receiver to reduce its power consumption without affecting its operation range.

However, the system and method for communication using a hybrid signal should not be limited to wireless communications or hybrid ultralow power wakeup signals. The system and method may be applied to any wired or wireless communications. The hybrid signal may be used to transmit any suitable first and second set of information. The first set of information may be the same as or different from the second set of information.

Wireless Communication

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols. For example, the various aspects described herein may interoperate with or be used as part of the IEEE 802.11 ah protocol, which may use sub-1 GHz bands. However, it should be appreciated that a wide variety of other bands and wireless protocols are contemplated by the implementations described herein.

In some aspects, wireless signals in a sub-gigahertz band may be transmitted according to the 802.11 protocol using orthogonal frequency-division multiplexing (OFDM), direct-sequence spread spectrum (DSSS) communications, a combination of OFDM and DSSS communications, or other schemes. Implementations described herein may be used for sensors, metering, and smart grid networks. Advantageously, aspects of certain implementations may include wireless devices that may consume less power than devices implementing other wireless protocols, and/or may be used to transmit wireless signals across a relatively long range, for example about one kilometer or longer. These devices may be configured to operate on power provided by energy storage devices and may be configured to operate without replacing the energy storage device for long periods of time (e.g., months or years).

Certain of the devices described herein may further implement Multiple Input Multiple Output (MIMO) technology. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min \{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a wireless network includes various wireless devices (also referred to as wireless nodes) which are the components that access the wireless network. For example, there may be two types of wireless nodes: access points ("APs") and access terminals.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

An access terminal ("AT") may comprise, be implemented as, or known as a station ("STA"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol) compliant wireless link to obtain general connectivity to the Internet or to other wide area networks. In some implementations an STA may also be used as an AP.

Devices described herein, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example an 802.11 standard. The wireless communication system 100 may include an AP 104, which communicates with STAs 106a, 106b, 106c, 106d, and 106e (collectively STAs 106).

STA 106e may have difficulty communicating with the AP 104 or may be out of range and unable to communicate with the AP 104. As such, another STA 106d may be configured as a relay 112 that relays communications between the STA 106e and the AP 104.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
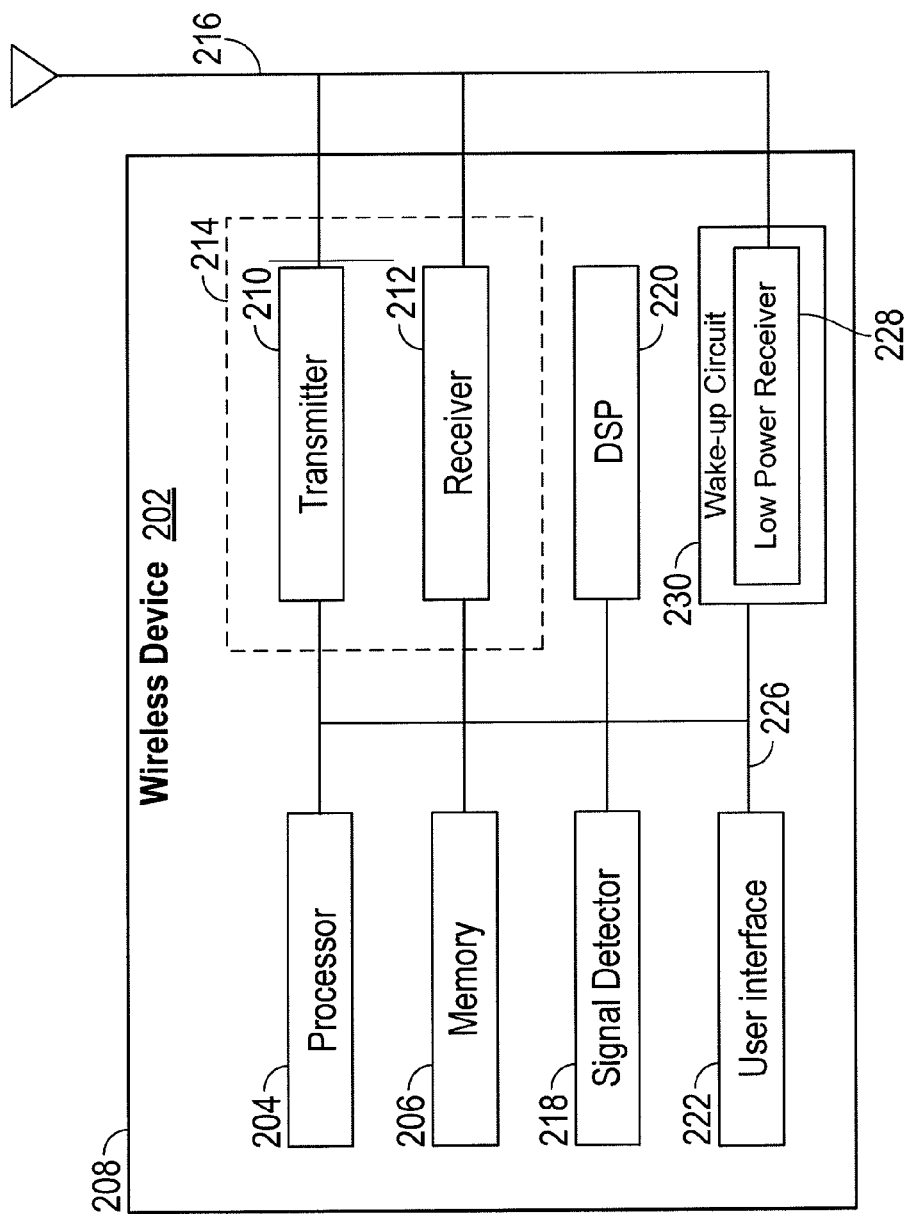
FIG. 2 shows a functional block diagram of an exemplary wireless device that may be employed within the wireless communication system of FIG. 1, in accordance with one implementation.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104, or one of the STAs 106 of FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a wake-up circuit 230 comprising a second, low power receiver 228. In one aspect, the low power receiver 228 may be configured to consume power that is lower than power normally consumed by the receiver 214 during operation. For example, the low power receiver 228 may be configured to consume on the order of 10×, 20×, 50× or 100× (or more) less power when operating as compared to the transceiver 214. In one aspect, the low power receiver 228 may be configured to receive signals using modulation/demodulation techniques such as on-off keying or frequency-shift keying (FSK) as compared to the transceiver 214 that may be configured to transmit and receive signals based on OFDM and other comparable techniques. A STA 106 that is a wireless device 202 having the low power receiver 228 may be referred to herein as a low power receiver STA 106e. Other STAs that may not include the low power receiver 228 or may be operating in a mode where the transceiver 214 is activated may be referred to herein as a STA 106.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

Figure 3:
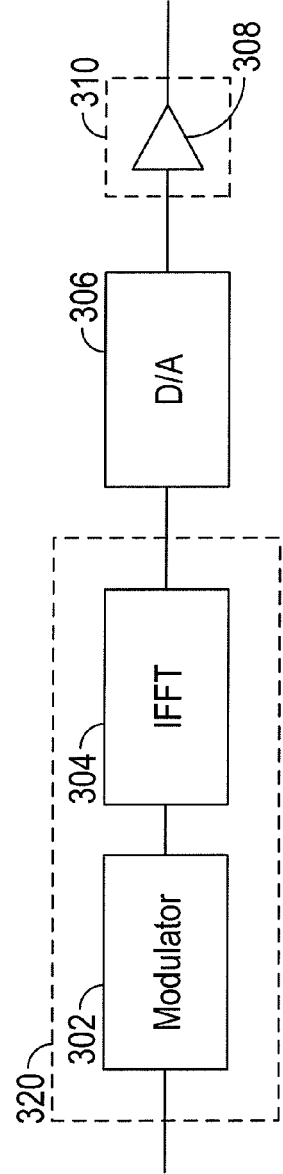
FIG. 3 shows a functional block diagram of exemplary components that may be utilized in the wireless device of FIG. 2 to transmit wireless communications, in accordance with one implementation.

As discussed above, the wireless device 202 may comprise an AP 104, a STA 106, or a low power receiver STA 106e. FIG. 3 illustrates various components that may be utilized in the wireless device 202t to transmit wireless communications. The components illustrated in FIG. 3 may be used, for example, to transmit OFDM communications.

The wireless device 202t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304. It should be appreciated that the transform module 304 may be configured to operate according to additional modes where 128 points, 256 points, 512 points, and 1024 points are used, and the like.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202t (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 202t may further comprise a digital to analog converter 306 configured to convert the output of the transform module into an analog signal. For example, the time-domain output of the transform module 304 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

Figure 4:
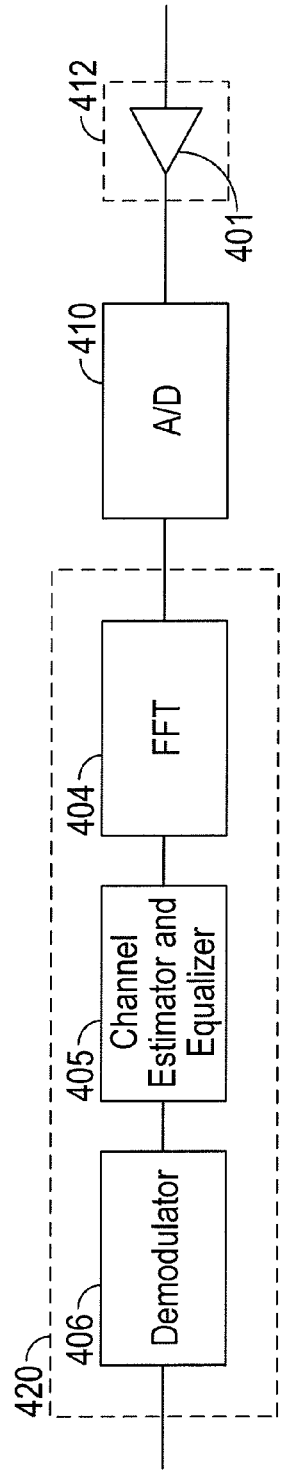
FIG. 4 shows a functional block diagram of exemplary components that may be utilized in the wireless device of FIG. 2 to receive wireless communications, in accordance with one implementation.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 412 of wireless device 202r is configured to receive one or more packets or data units in a wireless signal. Data units that may be received and decoded or otherwise processed as discussed below.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202r may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 202r. In some aspects, the analog to digital converter 410 is implemented in the transceiver 214 (FIG. 2) or in a data receive processor.

The wireless device 202r may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses. It should be appreciated that the transform module 404 may be configured to operate according to additional modes where 128 points, 256 points, 512 points, and 1024 points are used, and the like.

The wireless device 202b may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 202t may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 412 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 202t shown in FIG. 3 shows an example of a single transmit chain to be transmitted over an antenna. The wireless device 202r shown in FIG. 4 shows an example of a single receive chain to be received over an antenna. In some implementations, the wireless device 202t or 202r may implement a portion of a MIMO system using multiple antennas to simultaneously transmit data.

Accordingly, certain implementations are directed to sending wireless signals using a variety of different bandwidths in different frequency ranges. For example, in one exemplary implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width. In addition, additional modes or configuration are possible such as for example of using bandwidths of 20 MHz, 40 MHz, 80 MHz, and the like in the 2.4 GHz band or the 5 GHz. Band.

In a STA 106, a significant source of power consumption may be due to the long time spent by the STA 106 in receive mode, either during packet reception and especially during the time a receiver is on and waiting to receive a packet. In battery operated STAs, transmit power may be comparable to receive power, but receive time may be much longer than transmit time. Particularly when operating using a battery, it is desirable to reduce the awake time of STAs to reduce power consumption. One way to reduce the awake time of a STA 106 is to turn off the STA receiver 212 for a majority of a time interval except for certain short intervals of time. In this case, the transmitter 210 and receiver 212 may be controlled such that an on/off cycle of the transmitter 210 and receiver 212 is coordinated. In some cases, this may not be flexible or efficient. For example, in typical applications, the traffic pattern may not be predictable. In addition, the agreed awake time may not match the traffic pattern so some awake times may be useless. In addition, the traffic may come at times where STA 106 is off and there may be no way to deliver the packet until the STA 106 wakes up.

In an implementation, a low power receiver 228 as described above may be provided in a low power receiver STA 106e. In one aspect, the low power receiver STA 106e may communicate with an AP 104. In this case, there may be an association (e.g., registration) procedure where certain information is exchanged between the low power receiver STA 106e and the AP 104 to determine future communication parameters and activities. In another aspect, the low power receiver STA 106e may communicate between other STAs that are not associated with each other.

In one aspect, the low power receiver 228 may remain on substantially indefinitely while the low power receiver STA 106e is in operation. In another aspect, the low power "wake up" receiver 228 may be operate according to an on/off duty cycle as defined by a given schedule, to further reduce energy consumption. For example, the processor 204 or a controller (not shown) may regulate the schedule. Furthermore, the processor 204 may be configured to otherwise control when the low power receiver 228 listens for the wake-up signal for different durations and time periods (e.g., awake periods for example during business hours as compared to other sleep periods).

According to an implementation, to maximize sleep, the transceiver 214, analog and digital, may be configured to be off (e.g., powered down). The only circuit that is powered is the RF wake-up circuit 230. The low power receiver 228 of the RF wake-up circuit 230 may listen for a particular RF signal structure. When detected, the RF wake-up circuit 230 turns on or otherwise activates the transceiver 214. In some cases, the transceiver 214 and modem may take ~100-200 us to wake-up (assuming transceiver 214 stays powered). The wake up time may be a function of PLL convergence time, loading of calibration coefficients, and other register loading. In some cases, wake-up time may be as large as ~2 ms if transceiver 214 is fully powered off as well. Thus, in one aspect, the wake-up packet may reserve a wireless medium for a time period for the transceiver 214 to wake-up and start receiving data and include the special RF signal structure.

In some implementations, a low power receiver STA 106e may not be associated with other STAs. For examples the low power receiver STA 106e and other STAs may not be associated with an AP and their interaction with each other is based on events and temporary proximity (e.g., asynchronous operation). For example, in a building, a battery operated small sensor is placed in each room. Each sensor may be configured as a low power receiver STA 106e. As described above, the transceiver 214 of the STA 106e is normally off, to save power. In one example, a smartphone, configured as a STA 106, is brought into the building and wants to interact with the sensor STA 106e, e.g., to discover its location or issue a command. The smartphone STA 106 issues a low power wake up signal. A neighboring sensor STAs 106e may be configured to detect the low power wake-up signal using the wake-up circuit 230 and activate or turn on the transceiver 214 (radio). Either the sensor STA 106e proactively sends a packet indicating the location, or the sensor STA 106e waits for reception of a packet from the smartphone STA 106 to determine which action to take.

The wake-up circuit 230 may be configured to operate according to several modes. For example, in a first mode the low power receiver 228 is always on and waiting to receive a wake up packet. This may ensure fastest response but results in higher power consumption. In another mode, the low power wake-up receiver 228 is not always on and may operate according to a wake-up duty cycle. The wake up duty cycle may be adapted to tolerable interaction delay. In some cases, the wake up signal may therefore be sent multiple times to find the receiver in the ON state.

In other implementations a low power receiver STA 106e may be associated with an AP 104. As such, in one aspect, the low power receiver STA 106e interaction is with the AP 104 and can exploit cooperation with the AP 104 (e.g., synchronous operation is possible). For example, when associated there may be ways to enhance existing power save modes. For example, in a power save mode, a low power receiver STA 106e may wake up to receive beacons. The beacon indicates if the low power receiver STA 106e needs to stay awake further to receive downlink data (e.g., paged). In addition, there may be enhancement with low power wakeup receiver 228 where the AP 104 sends a low power wake-up signal before the beacon, indicating whether the low power receiver STA 106e is (or may) be paged in the beacon. If the low power receiver STA 106e will not be paged, or is unlikely to be paged, the low power receiver STA 160e need not turn on the transceiver 214 to receive the beacon to save power. In these cases, the low power receiver 228 may need to be on at least some time before the beacon, to receive the wake-up signal.

In addition, by using association there may be benefits based on traffic assumption. For example as there may be a low probability of downlink data (in this case the low power receiver STA 106e may go to sleep most of the times after the low power wake-up signal. In addition, there may be benefits in the case of long sleep time and large clock drift where the low power wake-up signal indicates when a beacon is coming. The low power receiver STA 1063 need not turn on the transceiver 214 until that time.

The RF low power wake-up signal may be transmitted on the same channel as other data signals. For example, the low power wake-up signal may be transmitted on the same channel as Wi-Fi data signals. As such, coexistence with the other data is provided. More particularly, coexistence with Wi-Fi signals may be provided. In one aspect, various considerations may be taken into account for providing coexistence. For example, a wake-up signal may have narrower bandwidth than a Wi-Fi signal. In addition, there may be regulatory limitations on how narrowband the wakeup signal can be which may imply a limit on the sensitivity/range. The low power receiver STAs 106e may be power constrained and likely using low transmit power themselves. As such, for STAs 106e in an associated state (e.g., likely to be close to the AP 104), the downlink link budget may be several dB better than the uplink one. Furthermore, it may be acceptable that the sensitivity of low wake up receiver 228 is up to ~20 dB worse than the regular receiver. For non-associated STAs, for proximity application (e.g. location tags, non-associated scenario) the applications may require less sensitivity, because the range may be less important.

In general, the wake-up signal may trigger one or more behaviors at recipient STAs. For example, among other behaviors, in response to receiving the wake-up signal, a STA may turn on the WiFi receiver, turn OFF the ULP receiver, and/or perform a specific command, with or without turning on the WiFi receiver. For example, a STA may turn on a related actuator, send a PS-Poll/ACK, and/or read the beacon with or without turning on the WiFi receiver.

The behavior may be inherent in the reception of the wake-up signal, or may be explicitly conveyed in the wake-up signal. If inherent, the behavior may be in response to the mere reception of the wake-up signal at the intended STA. The behavior upon reception may be configured with a WiFi management exchange between the STA and the AP. For example, the AP may assign a behavior, such as to wake-up or to sleep, for the STA upon future receipt of a wake-up signal. If a command is explicitly indicated in the packet, X bits may be used.

For example, certain bits in the ULP message, or wake-up signal, may indicate a specific action that the receiver is to take upon reception. If X bits are allocated for command, $2^x$ commands are possible. Some commands may be explicitly defined by the telecommunication protocol specification. Some or most of the $2^x$ command values may be left undefined. They may, for example act as a 'Payload' of the ULP packet and their meaning may be out of the scope of standardization.

One or more bits may indicate a type of packet, message, or command. One or more types can be left open, for example, for vendor specification. One or more bits may indicate the command.

The specific commands are not limited, and may include standardized commands, such as: wakeup, wakeup and send PS-Poll, wakeup and send PS-Poll in a pre-determined time, wakeup and read the beacon, wakeup and send an ACK when possible, back to doze or sleep, grant for UL transmission without contention, a generic ON/OFF command. Other commands may be additionally or alternatively used.

In some implementations the frame of the wake-up signal may include multiple addresses. In alternative implementations the frame may not include any address at all. For example, the AP wakes up all the STAs that are on ULP-awake mode in a given time. The AP can associate a time interval to ULP enabled STAs, divide the time interval into different slots, and assign each slot to one or more STAs. The AP can wake up particular STAs by transmitting a ULP wakeup signal in the time slot assigned to the particular STAs.

The particular type of address is not limited, and may be included in the wake-up signal. In some implementations the address may be a ULP-ID. For example, the ULP-ID may be a (partial) unicast AID (PAID). In some implementations, multiple ULP-IDs may be assigned to a single STA. The ULP-ID may be a group ID. For example, the AP may assign the ULP-ID to multiple STAs. In some implementations the AP is in charge of assigning ULP-IDs and creating groups. In some implementations algorithms for such assignments are not included in the standard specification, and may depend on implementation. In some implementations, the ULP-ID includes a partial identifier of the BSS. In some implementations, a common broadcast ULP-ID is assigned to all STAs associated with the AP.

Management frames may be defined for the assignment of the ULP-IDs. At association or later when requesting the use of ULP, a STA may also implicitly request to be assigned a ULP-ID. Depending on the definition of ULP-ID, assignment may be implicitly defined. For example the ULP-ID of a STA may be a function of the STA's AID and/or BSSID or MAC address.

If the ULP-ID is not implicit, the AP may, in the response granting the use of PS-ULP mode, also indicate one or more ULP-IDs or ULP-group-IDs. If the STA has no ULP-ID, the AP may convey the information about the assigned ULP-slot for the STA implicitly (e.g., computed from group-ID or AID) or explicitly (e.g., in a management frame or at the time of association).

As discussed above, non-associated STAs may transmit or receive ULP wake-up signals. These STAs do not have an AID as they are not associated with an AP. A global ID may be used to indicate the address of the non-associated STA to be woken up. Alternatively, the ULP-ID for the non-associated STA may be based on the type of STA, where the type may depend on a characteristic of the STA, such as vendor or function. In some implementations, the ULP-ID for the non-associated STA may be based on the type of traffic or QoS. In some implementations, the ULP-ID for the non-associated STA may be a function of the full MAC address of the non-associated STA. Alternatively, the ULP-ID may be provided by an application or by a user.

As discussed above, X bits may be may be included in or with the wake-up signal to specify one or more commands to be executed in response to the STA receiving the wake-up signal. The following non-limiting examples of X bits and associated definitions or functionality may be used in various implementations, and in various combinations.

X1 bits may be used to indicate how many more ULP signals will follow this signal. This information, may, for example, be used by a STA to determine that the AP having sent the wake-up signal is going to be busy for a certain time following the receipt of the wake-up signal. For example, if 2 X1 bits are used, and there are two more signals following the current ULP signal, the X1 bits may indicate 10. If n X1 bits are used, and more than $2^n-1$ signals follow, the X1 bits indicate $2^n-1$. In the case that 1 X1 bit is used the X1 bit indicates whether additional ULP signals follow.

X2 bits may be used to show the behavior of the AP after sending the ULP signal. For example, X2 bits may indicate whether the AP will send an ACK or is unable to receive uplink packets in a period of time.

X3 bits may be used to convey time synch information, such as the timestamp, or a number of bits of the timestamp at the AP. This may be important since time drifting at the STA has a significant effect on power consumption. In some implementations, the time of the transmitted ULP signal can give some information about the timestamp, and some part of the timestamp can be calculated or determined from the X3 bits.

X4 bits may be used to indicate the structure or contents of the ULP signal. For example, the X4 bits may indicate how many bits of the timestamp the wake-up signal contains. In some implementations, X4 bits are used to specify or modify the definitions of other X bits.

X5 bits may be used to indicate information about the other STAs. For example, the X5 bits may indicate how many wake-up signals follow for other STAs, so that the STA can start contenting for the medium.

X6 bits may be used to indicate any encoding modes of the ULP signal.

X7 bits may be used to indicate particular information that is generally found in a beacon or a management frame. In such implementations, the STA can receive the information via the ULP signal without reading the beacon or management frame.

X8 bits may be used to indicate how late or delayed the ULP signal is from the AP as compared with an expected time for the ULP signal. In some implementations, the STA can synch its clock with this information X9 bits may be used to indicate how many STAs are the ULP signal is intended for.

X10 bits may be used to include information about the medium or PHY parameters. For example, PHY encoding, a NAV, or a medium busy time, may be communicated with X10 bits.

X11 bits may be used to indicate what type the ULP signal is. For example, the ULP signal can be for awakening a STA or for synchronizing only, or the ULP signal may include some general information about all the STAs that receive the signal. In some implementations, X11 bits are used to specify or modify the definitions of other X bits.

X12 bits may be used to indicate a change in ULP signal protocol or definition for a next ULP signal. In some implementations X12 bits indicate how many ULP signals will follow having the changed protocol or definition or may indicate that the change is permanent or until further specified. X12 bits may specify PHY changes for the ULP signal, or MAC changes. For example, the time designation for a ULP slot may be changed, or the protocol or sequence of the wakeup signaling may be changed.

Any superset or subset of X1-X12 bits may be included in a ULP signal and which subset is included may be indicated in the signal itself. For example, X4 bits may always be present in the ULP signal which indicate the structure of the signal and what is included in the signal.

In some implementations, the wake-up signal is included in a PHY preamble, such as an 802.11 ah PHY preamble. The wake-up signal may be encoded using on/off keying (OOK).

In some implementations, a set of orthogonal sequences (e.g. PN) may be used. This may be especially beneficial if only 1 sequence is to be detected, for example, if using a PAID. In some implementations, the sequence may include an on/off keying (OOK)/amplitude shift keying (ASK)/frequency shift keying (FSK)/complementary code keying (CCK) sequence.

In some implementations, a fixed synchronization sequence may be used. The fixed synchronization sequence may be followed by coded/spreaded data. This may be especially beneficial because the synchronization preamble may include a single detector with multiple coded bits. In some implementations, the synchronization sequence may include a OOK/ASK/FSK/CCK synchronization sequence, and may be followed by a low data rate OOK/ASK/CCK data sequence. Optionally a CRC field may also be included.

Figure 5A:
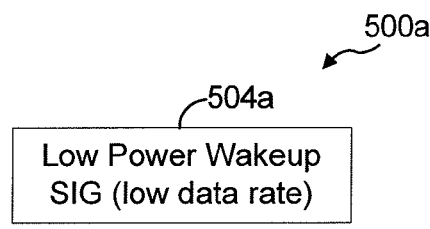
FIG. 5A shows an exemplary low power wake up signal, in accordance with one implementation.

FIG. 5A shows a structure of an exemplary low power wake-up signal 500a, in accordance with an implementation of the invention. For example, the wake-up signal 500a may be a single-phase signal 504a that carries an encoded signal. The wake-up signal may be transmitted using on-off keying, frequency-shift keying, or the like. For example, if using something similar to on-off keying, the wake-up signal 500a may be a sequence represented as zeros and ones. When the wake-up circuit 330 and low power receiver 228 detect a particular sequence of zeros and ones, the wake-up circuit 330 may trigger the behavior specified by the sequence. The wake-up circuit 330 may have multiple correlators to try to detect each possible signal.

Figure 5B:
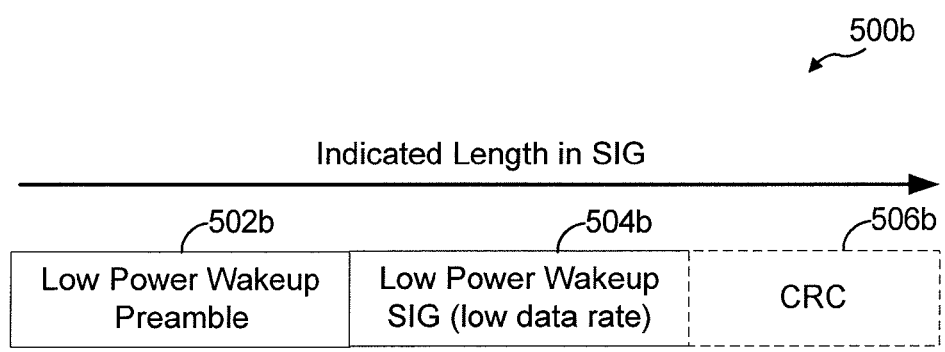
FIG. 5B shows another exemplary low power wake up signal, in accordance with one implementation.

FIG. 5B shows a structure of another exemplary low power wake-up signal 500b, in accordance with an implementation of the invention. The low power wake-up signal includes two portions. This first portion 502b includes a 'global' sequence (robust), i.e. like a 'low power wake up preamble.' This may allow the low power receiver 228 to detect that a low power signal 500b is coming up. The second portion 504b, following the first portion 502a, includes encoded information. The encoded information may indicate the identifier of the STA 106e to be woken up or other information. The encoded information may include one or more commands and X bits, as discussed above. Optionally, there may be a third portion 506b including a checksum for error detection. The first portion 502b may be formed using an on-off keying, frequency-shift keying, or other modulated preamble sequence that may provide the timing and detection. Spreading/encoding may be agreed by transmitting and receiving STAs.

In some implementations, the low power wake-up signal may be provided in a sequence of transmissions that provide for coexistence. For example, an additional 'Wakeup PPDU format' preamble may be provided, such as an new wake-up PPDU format for a 802.11 OFDM PHY preamble followed by the new low power wake-up signal. The OFDM PHY preamble may indicate a duration (in SIG field) that makes 802.11 STAs defer for the duration of the signal, the wake-up time for the receiver, and the duration of any other commands to be executed. The 802.11 STAs may assume there is a regular packet coming up. As such, reception of the payload may fail, but the 802.11 STA defers for the time indicated in PHY preamble. Furthermore, the low power wake-up signal may be provided to have up to ~20 ms signaling duration to match the duration of a typical PPDU. In addition, Null Packets (QoS Null frames to the STA) may be sent during the wake-up time (e.g., period of time the transceiver 214 of the low power receiver STA 106e needs to be turned on) to make sure other devices honor contention based mechanisms for accessing the channel. In addition, there may be multiple wake-up signals protected by a same PHY preamble. In addition, the PHY preamble may have a bandwidth that narrower than an 802.11 preamble. In some implementations, information of the 'Wakeup PPDU format' preamble may be encoded additionally or alternatively within the low power wake-up signal.

Hybrid Signals

Some wireless applications require devices having a very small battery size and extremely long standby time. In such applications, it is beneficial to reduce the standby current for a receiver of a wireless device. In implementations as will be described below, a hybrid signal including a wake up message is transmitted, allowing a receiver of the wireless device to reduce its standby current.

Figure 6A:
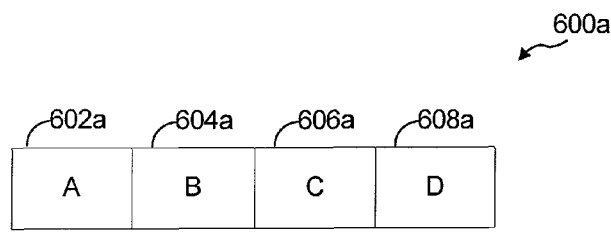
FIG. 6A shows a sequence of symbols in which a first set of information is encoded according to one implementation.
Figure 6B:
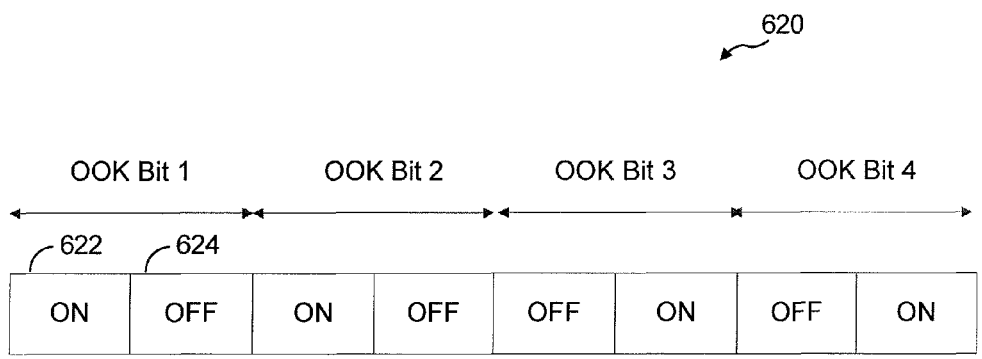
FIG. 6B shows a sequence of bits wherein a second set of information is encoded according to on-off-keying modulation in one implementation.
Figure 6C:
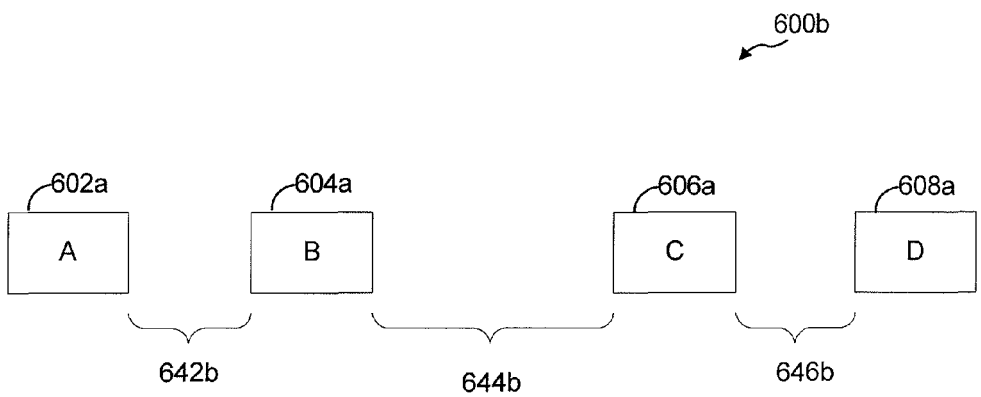
FIG. 6C shows a hybrid signal transmitted by a transmitter in one implementation.

FIGS. 6A-6C illustrate a hybrid signal. FIG. 6A shows a sequence of symbols in which a first set of information is encoded according to one implementation. The symbol sequence 600a includes symbol A (602a), symbol B (604a), symbol C (606a) and symbol D (608a). The symbols may be encoded according to any suitable scheme such as orthogonal frequency-division multiplexing (OFDM), direct-sequence spread spectrum (DSSS) communications, a combination of OFDM and DSSS communications, or other schemes. In one implementation, the symbols are encoded according a scheme other than on-off-keying modulation.

FIG. 6B shows a sequence of bits wherein a second set of information is encoded according to on-off-keying modulation in one implementation. On-off-keying (OOK) is a form of amplitude-shift keying modulation that represents digital data as the presence or absence of a carrier wave. FIG. 6B illustrates on-off keying using Manchester coding. However, other schemes of the OOK may also be used.

A second set of information is encoded in the OOK sequence 620 which includes four bits. Each bit includes an ON section in which a carrier wave is present and an OFF section in which a carrier wave is absent. The relative location of the ON and OFF section within each bit represents a binary value for the bit. An ON section placed before an OFF section represents one of a logic 1 and a logic 0, while an ON section placed after an OFF section represents the other of the logic 1 and logic 0. In FIG. 6B, the OOK Bit 1 includes an ON section 622 placed before an OFF section 624. The OOK Bit 2 has the same value as Bit 1. The OOK Bits 3 and 4 each has an ON section placed after an OFF section. In the illustrative implementation, the duration of the ON section is the same as the duration of the OFF section. In other implementations, the ON section and the OFF section may have different durations.

The OOK modulation requires less power consumption for a wireless receiver than other schemes such as OFDM and DSSS, because it does not require accurate local clock reference. However, the OOK modulation is more sensitive to noise and interference than the other schemes.

FIG. 6C shows a hybrid signal transmitted by a transmitter in one implementation. The hybrid signal 600b includes the same symbols 602a, 604a, 606a and 608a included in the symbol sequence 600a (shown above in FIG. 6A). Unlike the symbol sequence 600a in which the symbols are transmitted consecutively, the hybrid signal 600b includes spacing 642b, 644b and 646b among the symbols. The spacing is inserted into the symbols based on the OOK bit sequence 620 (shown above in FIG. 6B). As a result, the hybrid signal 600b has a lower data rate than the symbol sequence 600a.

The symbols A, B, C, and D are each transmitted during an ON section of the OOK bit sequence 620 (shown above in FIG. 6B). For instance, the symbol A is transmitted during the ON section 622 of the OOK Bit 1. The symbols B, C and D are transmitted during the ON section of the OOK Bit 2, 3 and 4 respectively. For each OFF section of the OOK bit sequence 620, a corresponding spacing is inserted among the symbols. As shown, the spacing 642b corresponds to the OFF section 624 of the OOK Bit 1. The spacing 646b corresponds to the OFF section of the OOK Bit 4. The spacing 644b corresponds to the OFF section of the OOK Bit 2 and the OFF section of the OOK Bit 3 which are next to each other. No symbols are transmitted during the spacing. The transmitter transmitting the hybrid signal 600b may be turned off during the spacing.

A receiver may determine the value of an OOK bit in the hybrid signal 600b, by checking whether a spacing is placed before or after a symbol within the period corresponding to the OOK bit. A spacing placed before a symbol within the bit period represents one of a logic 1 and a logic 0, while a spacing placed after a symbol represents the other of the logic 1 and logic 0.

The hybrid signal 600b thus includes both the first set of information encoded in the symbols and the second set of information encoded in the spacing among the symbols according to the OOK modulation. In the illustrative implementation, both the first set of information and the second set of information include a wake up signal which instructs a receiver to execute a command (e.g., the one shown above in FIGS. 5A and 5B). Thus, a receiver may extract the wake up signal by either decoding the first set of information from the symbols or decoding the second set of information from the spacing among the symbols. This allows the receiver to choose one or the other depending on signal strength of the signal it receives. When the signal strength is good, the receiver may decode the second set of information from the spacing among the symbols, as the OOK modulation consumes less power than the OFDM or DSSS scheme. When the signal strength is poor such that the receiver cannot decode the second set of information from the spacing among the symbols, the receiver may still decode the first set of information from the symbols, as the OFDM or DSSS is less sensitive to noise than the OOK modulation. A signal strength at which the receiver cannot decode the second set of information from the spacing among the symbols may represent a threshold value. Therefore, the hybrid signal allows a receiver to reduce its power consumption without affecting its operation.

In the illustrative implementation, the hybrid signal transmitted includes a wake up message in wireless communications. It should be noted that the hybrid signal may include any other information in wired or wireless communications.

In the illustrative implementation, the first set of information and the second set of information include the same wake up message. It should be noted that the first set of information and the second set of information may be different from each other depending on the particular application.

Figure 7:
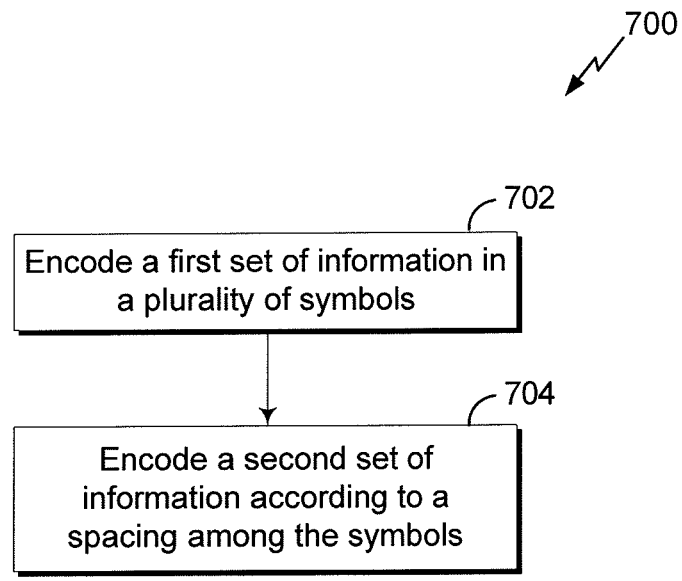
FIG. 7 is a flowchart of a method of communication.

FIG. 7 is a flowchart of a method of communication. The method 700 may be performed by any suitable apparatus for wired or wireless communication, such as the access point 104 and the low power receiver STA 106e (shown in FIG. 1). At block 702, the method includes encoding a first set of information in a plurality of symbols. The first set of information may be encoded as previously described in connection with FIGS. 6A and 6C. Moving to block 704, the method includes encoding a second set of information according to a spacing among the symbols. The second set of information may be encoded as previously described in connection with FIGS. 6B and 6C. The device may be any communication device such as a wireless node. In one implementation, the symbols may be transmitted to a device.

Figure 8:
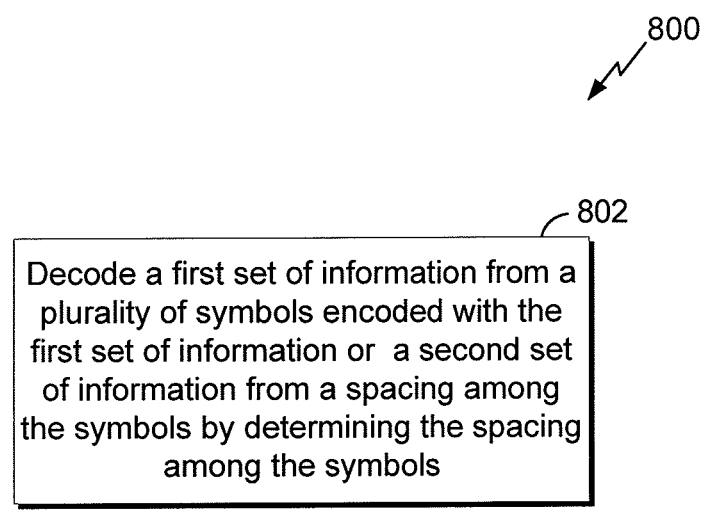
FIG. 8 is a flowchart of a method of communication.

FIG. 8 is a flowchart of a method of communication. The method 800 may be performed by any suitable apparatus for wired or wireless communication, such as the access point 104 and the low power receiver STA 106e (shown in FIG. 1). At block 802, the method includes decoding a first set of information from a plurality of symbols encoded with the first set of information or a second set of information from a spacing among the symbols by determining the spacing among the symbols. The first set of information may be decoded in accordance with the encoding previously described in connection with FIGS. 6A and 6C. The second set of information may be decoded in accordance with the encoding previously described in connection with FIGS. 6B and 6C. In one implementation, the symbols may further be received via a wireless communication.

In one implementation, both the first set of information and the second set of information include a wake up signal. A device in receipt of the wake up signal may execute a command in response to the wake up signal.

In one implementation, the decision to decode the first set of information or the second set of information is based on the signal strength of the signal (e.g., the symbols with the spacing among them). For example, a signal strength at which the receiver cannot reliably decode the second set of information from the spacing among the symbols may represent a threshold value. Thus, the first set of information may be decoded when the signal strength of the symbols is less than such a threshold value. The second set of information may be decoded when the signal strength of the symbols is greater than or equal to such a threshold value.

Figure 9:
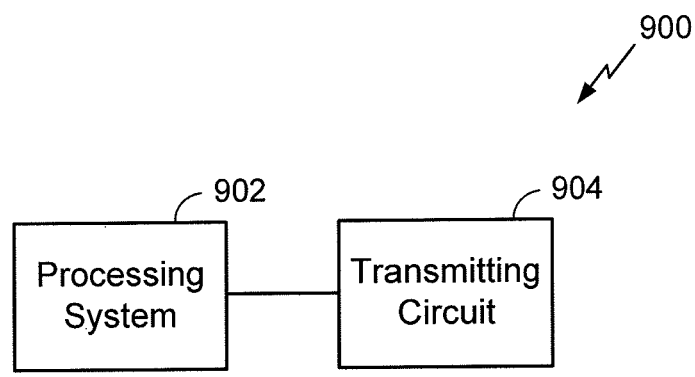
FIG. 9 is a simplified block diagram of several sample aspects of an apparatus for communication in one implementation.

FIG. 9 is a simplified block diagram of several sample aspects of an apparatus for communication in one implementation. Those skilled in the art will appreciate that the apparatus may have more components than illustrated in FIG. 9. The apparatus 900 includes only those components useful for describing some prominent features of implementations within the scope of the claims. In one implementation, the apparatus 900 is configured to perform the method 700 (shown above in FIG. 7). The apparatus 900 may be any suitable apparatus for wired or wireless communication, such as the access point 104 and the low power receiver STA 106e (shown in FIG. 1).

The apparatus includes a processing system 902 and a transmitting circuit 904. In one implementation the processing system 902 is configured to encode a first set of information in a plurality of symbols and to encode a second set of information according to a spacing among the symbols. The processing system 902 may include a processor. In one implementation the transmitting circuit 904 is configured to transmit to a device the symbols with the spacing among the symbols. The transmitting circuit 904 may be a transmitter. In one implementation, the apparatus 900 is a wireless node which may further include an antenna (not shown) via which the transmitting circuit 904 transmits to a device.

In one implementation, a means for encoding a first set of information in a plurality of symbols may include the processing system 902. Likewise, a means for encoding a second set of information according to a spacing among the symbols may include the processing system 902. For example, the means for encoding a first set of information may include a first encoder and the means for encoding a second set of information may include a second encoder. The first set of information may be encoded as previously described in connection with FIGS. 6A and 6C. The second set of information may be encoded as previously described in connection with FIGS. 6B and 6C. The first encoder and the second encoder may be integrated in one encoder or separate from each other. In one implementation, means for transmitting to a device the symbols with the spacing among the symbols includes a transmitter.

Figure 10:
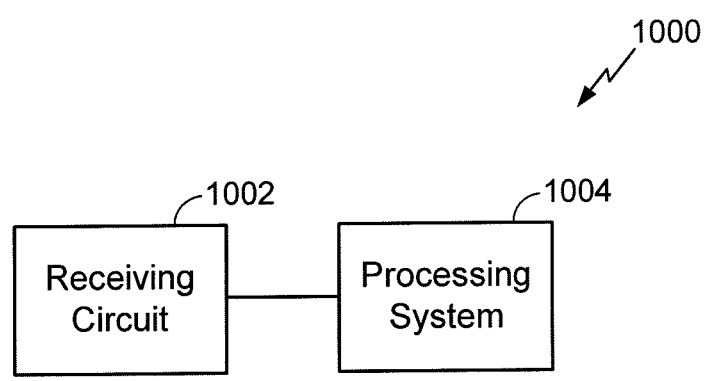
FIG. 10 is a simplified block diagram of several sample aspects of an apparatus for communication in one implementation.

FIG. 10 is a simplified block diagram of several sample aspects of an apparatus for communication in one implementation. Those skilled in the art will appreciate that the apparatus may have more components than illustrated in FIG. 10. The apparatus 1000 includes only those components useful for describing some prominent features of implementations within the scope of the claims. In one implementation, the apparatus 1000 is configured to perform the method 800 (shown above in FIG. 8). The apparatus 1000 may be any suitable apparatus for wired or wireless communication, such as the access point 104 and the low power receiver STA 106e (shown in FIG. 1).

The apparatus includes a receiving circuit 1002 and a processing system 1004. In one implementation the receiving circuit 1002 is configured receive a plurality of symbols, the symbols being transmitted with spacing among the symbols, the symbols being encoded with a first set of information, the spacing among the symbols being encoded with a second set of information. The receiving circuit 1002 may be a receiver. In one implementation the processing system 1004 is configured to decode the first set of information from the symbols or the second set of information from the spacing among the symbols. The processing system 1004 may include a processor. In one implementation, the apparatus 1000 is a wireless node which may further include an antenna (not shown) via which the receiving circuit 1002 receives the plurality of symbols. In one implementation, means for receiving a plurality of symbols includes a receiver. In one implementation, means for decoding the first set of information from a plurality of symbols encoded with the first set of information includes a first decoder and means for decoding a second set of information from a spacing among the symbols by determining the spacing among the symbols includes a second decoder. The first set of information may be decoded in accordance with the encoding previously described in connection with FIGS. 6A and 6C. The second set of information may be decoded in accordance with the encoding previously described in connection with FIGS. 6B and 6C.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium encoded thereon with instructions (and/or stored thereon), the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage device such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for communication, comprising:
   a processing system configured to:
   encode a first set of information in a plurality of symbols,
   insert a spacing among the plurality of symbols such that a spacing placed before a symbol of the plurality of symbols represents one of a logic 1 and a logic 0, and the spacing placed after the symbol represents the other, the spacing placed before or after each symbol having a different transmission duration from a transmission duration of the symbol, the spacing conveying a second set of information independent of the first set of information, and
   provide the plurality of symbols for transmission to a wireless node according to the spacing.

2. The apparatus of claim 1, wherein the second set of information is conveyed according to on-off-keying modulation.

3. The apparatus of claim 1, wherein the first set of information is encoded in the plurality of symbols according to orthogonal frequency-division multiplexing.

4. The apparatus of claim 1, wherein the first set of information is encoded in the plurality of symbols according to direct-sequence spread spectrum (DSSS).

5. The apparatus of claim 1, wherein the first set of information is different from the second set of information.

6. The apparatus of claim 1, wherein both the first set of information and the second set of information comprise a wake-up message instructing the wireless node to execute a command.

7. A method of communication, comprising:
   encoding a first set of information in a plurality of symbols;
   insert a spacing among the plurality of symbols such that a spacing placed before a symbol of the plurality of symbols represents one of a logic 1 and a logic 0, and the spacing placed after the symbol represents the other, the spacing placed before or after each symbol having a different transmission duration from a transmission duration of the symbol, the spacing conveying a second set of information independent of the first set of information; and
   transmitting the plurality of symbols to a wireless node according to the spacing.

8. The method of claim 7, wherein the second set of information is conveyed according to on-off-keying modulation.

9. The method of claim 7, wherein, encoding the first set of information comprises encoding the first set of information in the plurality of symbols according to orthogonal frequency-division multiplexing.

10. The method of claim 7, wherein encoding the first set of information comprises encoding the first set of information in the plurality of symbols according to direct-sequence spread spectrum (DSSS).

11. The method of claim 7, wherein the first set of information is different from the second set of information.

12. The method of claim 7, wherein both the first set of information and the second set of information comprise a wake-up message instructing the wireless node to execute a command.

13. An apparatus for communication, comprising:
    means for encoding a first set of information in a plurality of symbols;
    means for inserting a spacing among the plurality of symbols such that a spacing placed before a symbol of the plurality of symbols represents one of a logic 1 and a logic 0, and the spacing placed after the symbol represents the other, the spacing placed before or after each symbol having a different transmission duration from a transmission duration of the symbol, the spacing conveying a second set of information independent of the first set of information; and
    means for transmitting the plurality of symbols to a wireless node according to the spacing.

14. The apparatus of claim 13, wherein the second set of information is conveyed according to on-off-keying modulation.

15. The apparatus of claim 13, wherein the first set of information is encoded in the plurality of symbols according to orthogonal frequency-division multiplexing.

16. The apparatus of claim 13, wherein the first set of information is encoded in the plurality of symbols according to direct-sequence spread spectrum (DSSS).

17. The apparatus of claim 13, wherein the first set of information is different from the second set of information.

18. The apparatus of claim 13, wherein both the first set of information and the second set of information comprise a wake-up message instructing the wireless node to execute a command.

19. A non-transitory computer readable storage medium comprising instructions that when executed cause an apparatus to:
    encode a first set of information in a plurality of symbols;
    insert a spacing among the plurality of symbols such that a spacing placed before a symbol of the plurality of symbols represents one of a logic 1 and a logic 0, and the spacing placed after the symbol represents the other, the spacing placed before or after each symbol having a different transmission duration from a transmission duration of the symbol, the spacing conveying a second set of information independent of the first set of information; and
    transmit the plurality of symbols to a wireless node according to the spacing.

20. A wireless node, comprising:
    a processing system configured to:
    encode a first set of information in a plurality of symbols,
    insert a spacing among the plurality of symbols such that a spacing placed before a symbol of the plurality of symbols represents one of a logic 1 and a logic 0, and the spacing placed after the symbol represents the other, the spacing placed before or after each symbol having a different transmission duration from a transmission duration of the symbol, the spacing conveying a second set of information independent of the first set of information; and a transmitter configured to:

transmit, via the at least one antenna, to another wireless node, the symbols with the spacing among the symbols.

21. An apparatus for communication, comprising:

a processing system configured to:

receive a plurality of symbols from a wireless node;
selectively determine whether to decode the plurality of symbols or a spacing among the plurality of symbols based on a signal strength of the plurality of symbols;
based on the determination:
  decode to obtain a first set of information from the plurality of symbols, or
  decode to obtain a second set of information from the spacing among the plurality of symbols, the spacing conveying the second set of information independent of the plurality of symbols; and
instruct the apparatus to execute a command based on which of the first set of information or the second set of information is obtained.

22. The apparatus of claim 21, wherein the spacing among the plurality of symbols is decoded according to on-off-keying modulation.

23. The apparatus of claim 21, wherein the processing system is further configured to determine the spacing such that a spacing placed before a symbol of the plurality of symbols is identified as one of a logic 1 and a logic 0, and the spacing placed after the symbol is identified as the other.

24. The apparatus of claim 21, wherein the plurality of symbols is decoded if the determination indicates the signal strength of the symbols is less than a threshold value.

25. The apparatus of claim 21, wherein the spacing among the plurality of symbols is decoded if the determination indicates the signal strength of the symbols is greater than or equal to a threshold value.

26. The apparatus of claim 21, wherein the symbols are decoded according to orthogonal frequency-division multiplexing.

27. The apparatus of claim 21, wherein the symbols are decoded according to direct-sequence spread spectrum (DSSS).

28. The apparatus of claim 21, wherein both the first set of information and the second set of information comprise a wake-up message, wherein the processing system is further configured to execute a command in response to the wake-up message.

29. A method of communication, comprising:

receiving, at an apparatus, a plurality of symbols from a wireless node;
selectively determining whether to decode the plurality of symbols or a spacing among the plurality of symbols based on a signal strength of the plurality of symbols;
based on the determination:
  decoding to obtain a first set of information from the plurality of symbols, or
  decoding to obtain a second set of information from the spacing among the plurality of symbols, the spacing conveying the second set of information independent of the plurality of symbols; and
instructing the apparatus to execute a command based on which of the first set of information or the second set of information is obtained.

30. The method of claim 29, wherein decoding to obtain the second set of information comprises decoding the spacing among the plurality of symbols according to on-off-keying modulation.

31. The method of claim 29, wherein decoding to obtain the second set of information comprises determining the spacing such that a spacing placed before a symbol of the plurality of symbols is identified as one of a logic 1 and a logic 0, and the spacing placed after the symbol is identified as the other.

32. The method of claim 29, wherein decoding to obtain the first set of information comprises decoding the plurality of symbols if the determination indicates the signal strength of the symbols is less than a threshold value.

33. The method of claim 29, wherein decoding to obtain the second set of information comprises decoding the spacing among the plurality of symbols if the determination indicates the signal strength of the symbols is greater than or equal to a threshold value.

34. The method of claim 29, wherein decoding to obtain the first set of information comprises decoding the plurality of symbols according to orthogonal frequency-division multiplexing.

35. The method of claim 29, wherein decoding to obtain the first set of information comprises decoding the plurality of symbols according to direct-sequence spread spectrum (DSSS).

36. The method of claim 29, wherein both the first set of information and the second set of information comprise a wake-up message, the method further comprising executing a command in response to the wake-up message.

37. An apparatus for communication, comprising:

means for receiving a plurality of symbols from a wireless node; and
means for determining whether to decode the plurality of symbols or a spacing among the plurality of symbols based on a signal strength of the plurality of symbols;
based on the determination:
  means for decoding to obtain a first set of information from the plurality of symbols, or
  means for decoding to obtain a second set of information from the spacing among the plurality of symbols, the spacing conveying the second set of information independent of the plurality of symbols; and
wherein the determining means is further configured to instruct the apparatus to execute a command based on which of the first set of information or the second set of information is obtained.

38. The apparatus of claim 37, wherein the means for decoding to obtain the second set of information comprises decoding the spacing among the plurality of symbols according to on-off-keying modulation.

39. The apparatus of claim 37, wherein the means for decoding to obtain the second set of information comprises determining the spacing such that a spacing placed before a symbol of the plurality of symbols is identified as one of a logic 1 and a logic 0, and the spacing placed after the symbol is identified as the other.

40. The apparatus of claim 37, wherein the means for decoding to obtain the first set of information comprises decoding the plurality of symbols if the determination indicates the signal strength of the symbols is below a threshold value.

41. The apparatus of claim 37, wherein the means for decoding to obtain the second set of information comprises decoding the spacing among the plurality of symbols if the determination indicates the signal strength of the symbols is greater than or equal to above a threshold value.

42. The apparatus of claim 37, wherein the means for decoding to obtain the first set of information comprises decoding according to orthogonal frequency-division multiplexing.

43. The apparatus of claim 37, wherein the means for decoding to obtain the first set of information comprises decoding according to direct-sequence spread spectrum (DSSS).

44. The apparatus of claim 37, wherein both the first set of information and the second set of information comprise a wake-up message, the apparatus further executes a command in response to the wake-up message.

45. A non-transitory computer readable storage medium comprising instructions that when executed cause an apparatus to:
   receive a plurality of symbols from a wireless node;
   selectively determine whether to decode the plurality of symbols or a spacing among the plurality of symbols based on a signal strength of the plurality of symbols;
   based on the determination:
      decoding to obtain a first set of information from the plurality of symbols, or
      decoding to obtain a second set of information from the spacing among the plurality of symbols, the spacing conveying the second set of information independent of the plurality of symbols; and
   instruct the apparatus to execute a command based on which of the first set of information or the second set of information is obtained.

46. A wireless node, comprising:
at least one antenna; and
a processing system configured to:
   receive, via the at least one antenna, a plurality of symbols encoded with a first set of information, wherein a second set of information is conveyed independent of the plurality of symbols, based in part on a spacing among the plurality of symbols;
   selectively determine whether to decode the plurality of symbols or the spacing among the plurality of symbols based on a signal strength of the plurality of symbols;
   based on the determination:
      decoding to obtain the first set of information from the plurality of symbols, or
      decoding to obtain the second set of information from the spacing among the plurality of symbols; and
   instruct the wireless node to execute a command based on which of the first set of information or the second set of information is obtained.

\* \* \* \* \*